United States Patent
Chen et al.

(10) Patent No.: US 7,623,136 B1
(45) Date of Patent: Nov. 24, 2009

(54) METHOD AND SYSTEM FOR PROCESSING TEXTURE SAMPLES WITH PROGRAMMABLE FILTER WEIGHTS

(75) Inventors: Wei-Chao Chen, San Jose, CA (US); Li-Yi Wei, Redwood City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 305 days.

(21) Appl. No.: 11/566,928

(22) Filed: Dec. 5, 2006

(51) Int. Cl.
*G09G 5/00* (2006.01)

(52) U.S. Cl. .............. 345/582; 345/584; 345/586; 345/587; 345/639; 382/260

(58) Field of Classification Search ............... 345/584
See application file for complete search history.

(56) References Cited

U.S. PATENT DOCUMENTS

| 6,130,674 A * | 10/2000 | Vaswani et al. ......... 345/586 |
| 6,366,290 B1 * | 4/2002 | Dye et al. ............... 345/582 |
| 7,505,036 B1 * | 3/2009 | Baldwin ................. 345/421 |
| 2002/0012002 A1 * | 1/2002 | Ito ...................... 345/552 |
| 2007/0008333 A1 * | 1/2007 | Xu ....................... 345/582 |

* cited by examiner

*Primary Examiner*—Antonio A Caschera
(74) *Attorney, Agent, or Firm*—Patterson & Sheridan, LLP

(57) ABSTRACT

A texture unit of a graphics processing unit provides the ability to switch among different filter modes depending upon shader program instructions that are received by the texture unit. One filter mode has the capability to extract filter weights that have been specified in a received shader program instruction rather than calculating the weights within the texture unit itself.

15 Claims, 6 Drawing Sheets

METHOD AND SYSTEM FOR PROCESSING TEXTURE SAMPLES WITH PROGRAMMABLE FILTER WEIGHTS

BACKGROUND OF THE INVENTION

1. Field of the Invention

The present invention generally relates to computer graphics and more particularly to a method and system for processing texture samples with programmable filter weights.

2. Description of the Related Art

Unless otherwise indicated herein, the approaches described in this section are not prior art to the claims in this application and are not admitted to be prior art by inclusion in this section.

Conventional graphics systems use texture mapping to add realism to a computer-generated scene. During a texture mapping operation, a texture lookup is generally performed to determine where on a texture map each pixel center falls. One pixel usually does not correspond only to one texture map element, also referred to as a texture sample or a texel. Thus, to calculate the optimal color for the pixel, some form of filtering involving multiple texels is performed.

FIG. 1A illustrates a portion of a graphics processing unit (GPU) conventionally involved in a texture filtering operation. This portion of the GPU includes a pixel shader 102, a texture unit 104, and memory 106. Pixel shader engine 102 executes a shader program that issues a texture mapping instruction to texture unit 104. In response to the instruction, texture unit 104 fetches the necessary texels from memory 106 and performs the necessary filtering operation using the fetched texels.

One technique commonly used in this texture filtering operation is bilinear interpolation, which interpolates among four texels to generate the final color value for a pixel. To illustrate, in FIG. 1B, $p_x$ represents a texture coordinate on the texture map 122. Suppose $p_x$ is surrounded by four nearby texels $p_0$, $p_1$, $p_2$, $p_3$ with the colors $C_0$, $C_1$, $C_2$, and $C_3$, respectively, one can calculate the texel color at $p_x$ by performing a bilinear interpolation as follows: (1) calculating the filter weights $w_0$, $w_1$, $w_2$, $w_3$ for the four surrounding texels based on their distance to $p_x$, (2) applying the filter weights to the colors of the texels, and (3) summing up the weighted average colors. Here the interpolated color at $p_x$ is referred to as $C_x$.

A prior art approach where the aforementioned steps are performed using the hardware shown in FIG. 1A has certain limitations. This "first approach" involves issuing a single TEX shader program instruction from pixel shader engine 102 to texture unit 104 to trigger the bilinear interpolation. However, in this approach, texture unit 104 calculates all the filter weights internally based on the positions of the four texels in the texture map relative to the pixel and does not afford the user any opportunity to specify the filter weights. For example, suppose the instruction issued by the shader program running on pixel shader engine 102 is TEX $R_0$, $p_x$, texture[122], where $R_0$ is the placeholder for the computed color value at texture coordinate $p_x$ on texture map 122 as shown in FIG. 1B. In response to this TEX instruction, texture unit 104 issues four separate read requests to memory 106 to fetch the texel colors $C_i$ for each of the four texels used in the bilinear interpolation (i.e., $C_0$, $C_1$, $C_2$, and $C_3$). After having received the requested texel colors $C_i$, texture unit 104 computes the color value $R_0$ by performing the steps (1)-(3) described above. Here, texture unit 104 calculates the filter weights based on fixed formulae using the distances between the location of $p_x$ in texture map 122 and the location of each of the four texels $p_0$, $p_1$, $p_2$ $p_3$. In other words, this first approach relies solely on hardware-generated filter weights to carry out the bilinear interpolation and provides neither the flexibility nor the image quality associated with filtering schemes that implement programmable filter weights.

Although the first approach may be relatively simple to implement, it can produce poor results in certain graphics applications. For example, in real-time applications that magnify a texture, the first approach may yield exceedingly blurry images. To alleviate this problem, Pradeep Sen in his article, "Silhouette Maps for Improved Texture Magnification," discusses a filtering method where discontinuity information in a texture map (the "second approach") is specified. FIG. 1C illustrates a scenario in which the benefits of the second approach over the first approach can be demonstrated. In the first approach, even though the screen pixel $R_1$ resides in the region of a texture map 124 that is entirely red, the colors of the four texels, $C_0$, $C_1$, $C_2$, and $C_3$, would still contribute to the final texture value for $p_x$. This resulting texture value therefore would not be exactly red, and this imprecise color would be especially noticeable under magnification. In the second approach, on the other hand, boundary edge 126 delineating a color discontinuity separating between red on the right side of the edge and blue on left side of the edge can be specified. Boundary edge 126 breaks up texture map 124 into different regions. The samples located on the same side of the boundary are grouped together in a filtering operation. So, because $p_x$ resides on the same red side as $p_i$ and $p_3$, only $C_1$ and $C_3$ are fetched and filtered to compute the texture value at $p_x$. The resulting texture value, unlike the first approach, would contain the precise red color in this example. It is worth noting that by specifying discontinuity, such as a boundary edge, the filter weights are also specified. For instance, by specifying boundary edge 126, the filter weights for $C_0$ and $C_2$ would be programmed to zero, because they do not contribute at all to the calculation of the texture value for $R_1$.

Even though the second approach supports a programmable and a more intelligent filtering method than the first approach, the second approach implemented using the hardware shown in FIG. 1A still has some shortcomings. In particular, texture unit no longer computes the final color value $C_x$, but rather transmits the color values of the four texels, $C_0$, $C_1$, $C_2$, and $C_3$, to pixel shader engine 102 for processing. This distribution of processing may lead to inefficient use of memory 106. To illustrate, implementing the second approach using the hardware of FIG. 1A and operating on texture map 122 shown in FIG. 1B would require the following instructions:

initialize Cx' to 0
(1) TEX $C_0$, $p_1$, texture[122]
(2) TEX $C_1$, $p_2$, texture[122]
(3) TEX $C_2$, $p_3$, texture[122]
(4) TEX $C_3$, $p_4$, texture[122]
(5) MAD $C_x'$, $C_0$, $w_0'$, $C_x'$
(6) MAD $C_x'$, $C_1$, $w_1'$, $C_x'$
(7) MAD $C_x'$, $C_2$, $w_2'$, $C_x'$
(8) MAD $C_x'$, $C_3$, $w_3'$, $C_x'$ The shader program issues the first four TEX shader program instructions to texture unit 104 to essentially retrieve the four texel colors, $C_0$, $C_1$, $C_2$, and $C_3$. Then the shader program issues the next four MAD instructions to pixel shader engine 102 with the used-specified filter weights $w_0'$, $w_1'$, $w_2'$, and $w_3'$ to compute the final output color stored in $C_x'$. So, even though the filter weights would be programmable via the MAD instructions, performing bilinear interpolation with these user-specified filter weights would require eight instructions. The first four instructions are executed by texture unit 104, and the second four instructions are executed by pixel shader engine 102. Moreover, because of the multi-threaded nature of pixel shader engine 102, even though the texture cache may have, in anticipation of cache access locality, prefetched $C_1$, $C_2$, and $C_3$ in the cache after instruction (1) is executed, these values very likely would have been flushed out of the cache by other intervening threads before instruction (2) is executed. With cache misses, memory 106 would need to be more frequently accessed, adding even more clock cycles to the already high number of clock cycles that would be needed to execute the eight instructions, resulting in performance inefficiencies and increased power consumption for the GPU.

As the foregoing illustrates, what is needed in the art is a more efficient technique for processing texture samples with programmable filter weights.

SUMMARY OF THE INVENTION

A method and system for processing texture samples with programmable filter weights are disclosed. Specifically, one embodiment of the present invention sets forth a method, which includes the steps of switching to a data path for receiving one or more programmable filter weights based on a first filter mode, receiving a first programmable filter weight corresponding to a first texel over the data path, wherein the first texel is associated with a screen pixel mapped to a texture map, fetching the first texel from the texture map, and computing a texture value for the screen pixel by applying the first programmable filter weight to the first texel.

At least one advantage of the present invention disclosed herein is the ability to compute texture samples with user-specified filter weights within a single cycle, so that more effective filtering mechanisms can be implemented without negatively impacting the overall system performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for processing texture samples with programmable filter weights are disclosed. In the following description, for the purposes of explanation, numerous specific details are set forth in order to provide a thorough understanding of the present invention. It will be apparent, however, to one skilled in the art that the present invention may be practiced without these specific details.

Throughout this disclosure, the term "user" broadly refers to a user or a developer of software program executing on a computing device. In addition, the terms "user-specified" and "programmable" can be used interchangeably to qualify filter weights as being specified by a user through shader programming. Also, some examples of a "computer-readable medium" referred to herein include, without limitation, non-volatile media (e.g., optical or magnetic disks) and volatile media (e.g., dynamic memory).

Figure 1A:
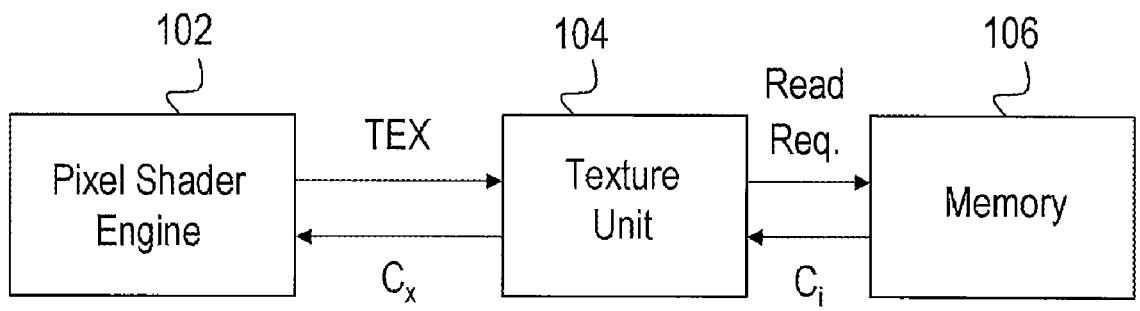
FIG. 1A illustrates a portion of a graphics processing unit that is configured to perform a prior art texture mapping operation.
Figure 1B:
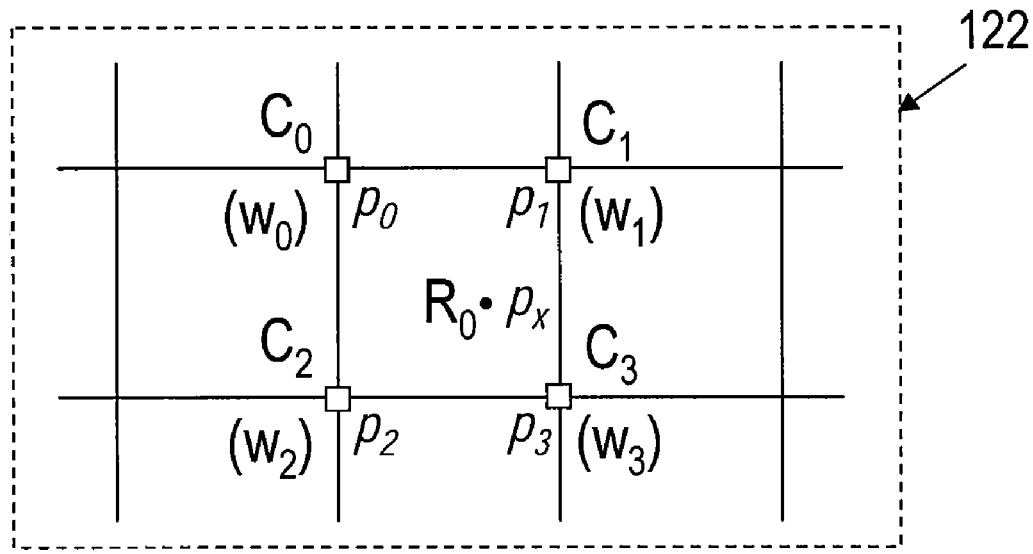
FIG. 1B is a portion of a texture map for illustrating a prior art bilinear interpolation operation with hardware-generated filter weights.
Figure 1C:
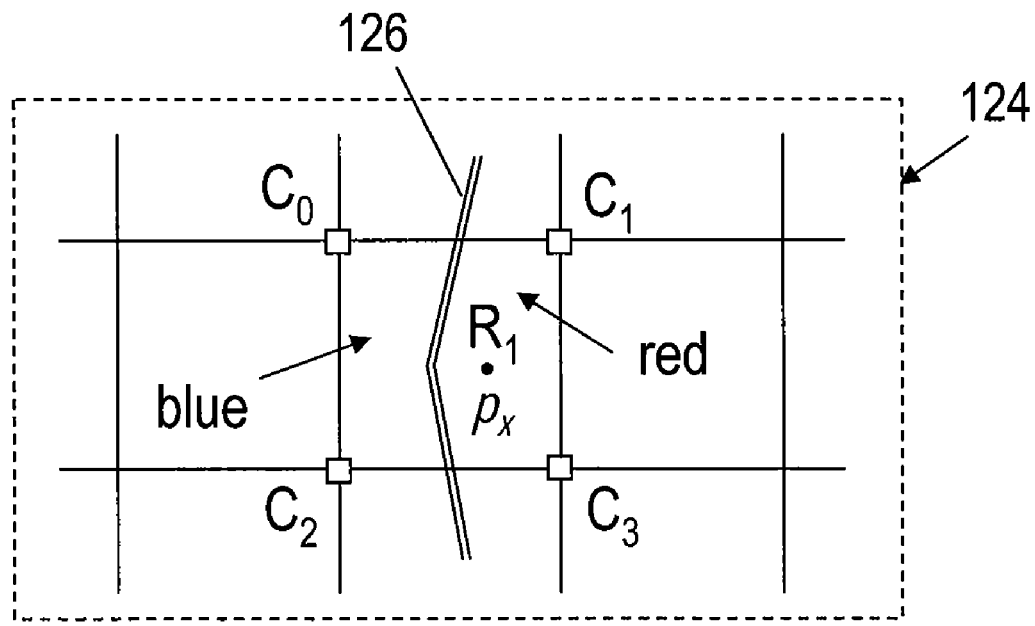
FIG. 1C is a portion of another texture map for illustrating a prior art bilinear interpolation operation with specified boundary edges.
Figure 2A:
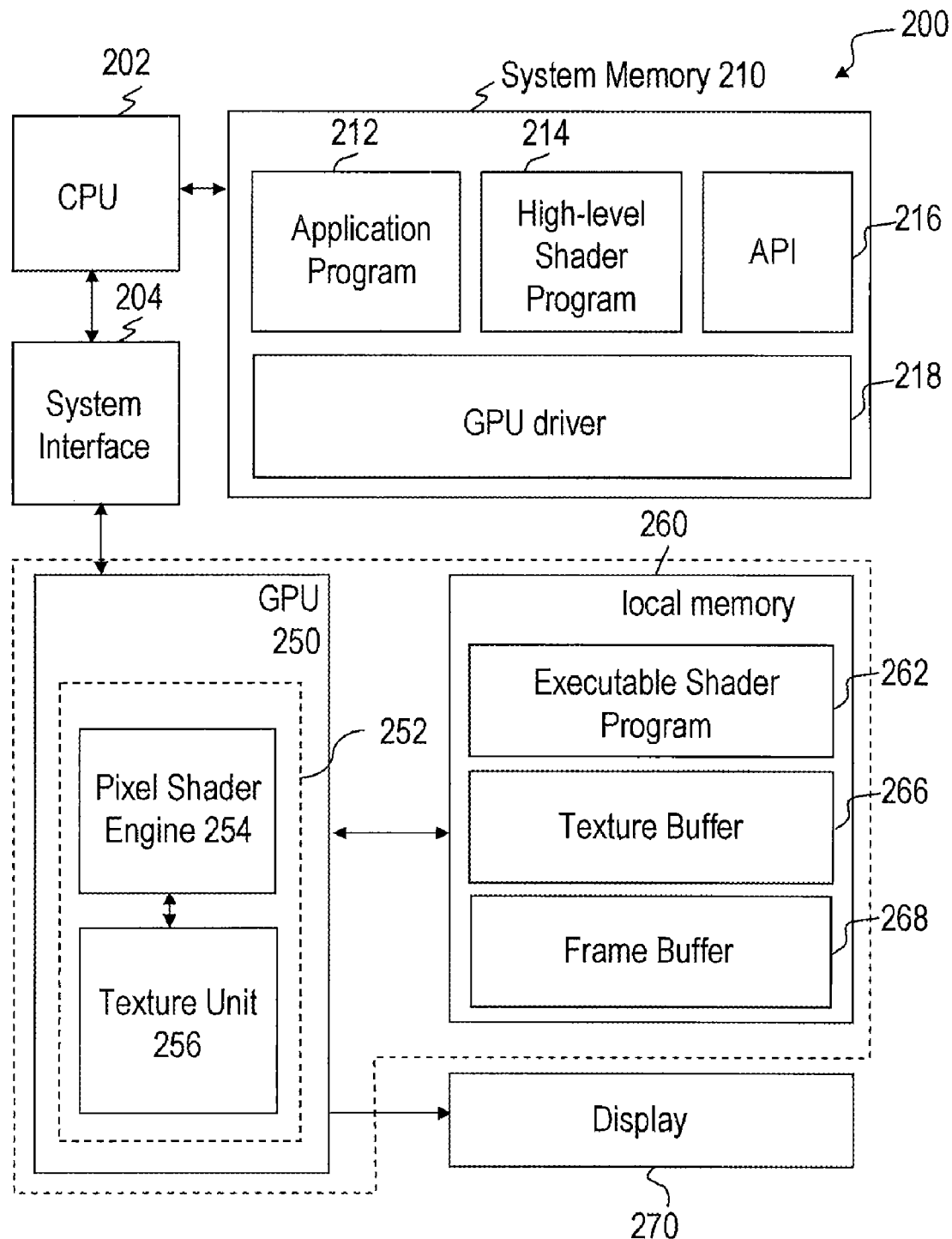
FIG. 2A is a conceptual diagram of a computing device configured to implement one or more aspects of the present invention.

FIG. 2A is a conceptual diagram of a computing device 200 configured to implement one or more aspects of the present invention. Computing device 200 includes, without limitation, a central processing unit (CPU) 202, a system interface 204, a system memory 210, a graphics processing unit (GPU) 250, a GPU local memory 260, and a display 270. CPU 202 connects to system memory 210 and system interface 204. The CPU 202 executes programming instructions stored in system memory 210, operates on data stored in system memory 210, and communicates with GPU 250 through the system interface 204, which bridges communication between CPU 202 and GPU 250. System memory 210 typically includes dynamic random access memory (DRAM) configured to either connect directly to CPU 202 (as shown) or alternately, via system interface 204. GPU 250 receives instructions transmitted by CPU 202 and processes the instructions in order to render graphics data and images stored in local memory 260 of GPU 250. GPU 250 displays certain graphics images stored in local memory 260 on display 270. Display 270 is an output device capable of emitting a visual image corresponding to an input data signal. For example, the display may be built using a cathode ray tube (CRT) monitor, a liquid crystal display, or any other suitable display system. In alternate embodiments, CPU 202, GPU 250, system interface 204, or any combination thereof, may be integrated into a single processing unit. Further, the functionality of GPU 250 may be included in a chipset or in some other type of special purpose processing unit or co-processor.

System memory 210 includes an application program 212, high-level shader programs 214, an application programming interface (API) 216, and a GPU driver 218. Application program 212 may invoke one or more instances of high-level shading program 214. The high-level shading programs are typically source code text of high-level programming instructions that are designed to operate on one or more processing engines within GPU 250. High-level shader programs 214 may be translated into executable program objects by a compiler and assembler included in GPU driver 218 or alternatively by an offline compiler and/or assembler operating either on computer device 200 or other computer devices.

GPU local memory 260 includes an executable shader program 262, a texture buffer 266, and a frame buffer 268. Executable shader program 262, when executed by pixel shader engine 254 in GPU 250, issues instructions to different components of rendering pipeline 252. Texture buffer 266 typically stores texture maps. Frame buffer 268 includes at least one two-dimensional surface that is used to drive the display 270.

GPU 250 includes a rendering pipeline 252 used to process data. Rendering pipeline 252 includes a pixel shader engine 254, which further includes a texture unit 256. As mentioned above, pixel shader engine 254 executes executable shader program 262 and issues instructions to components within rendering pipeline 252, such as pixel shader engine 254 and texture unit 256. Texture unit 256 is capable of retrieving requested texel attributes from texture buffer 266, processing filter weights, and performing requested texture filtering operations. Subsequent paragraphs will further detail the structure and functions provided by texture unit 256.

Figure 2B:
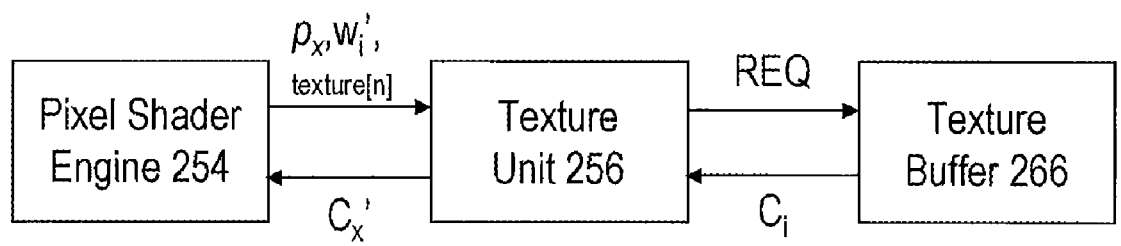
FIG. 2B is a schematic diagram of a portion of a graphics processing unit configured to perform a texture mapping operation, according to one embodiment of the present invention.
Figure 2C:
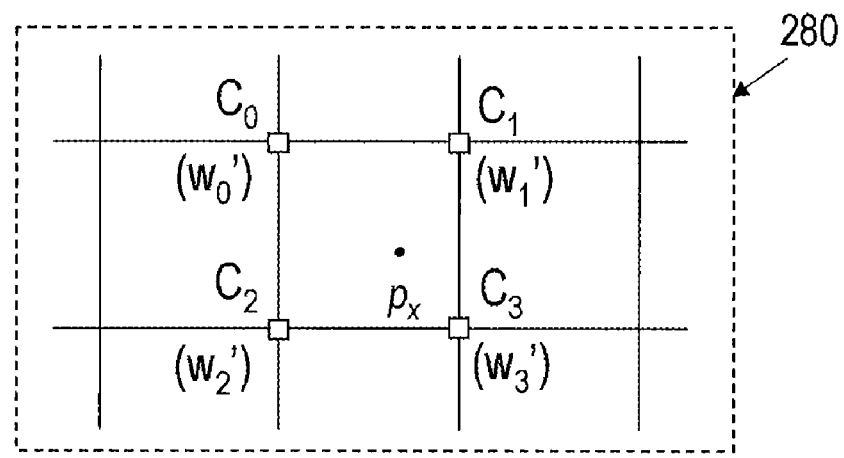
FIG. 2C is a portion of yet another texture map for illustrating a bilinear interpolation operation with programmable filter weights, according to one embodiment of the present invention.

'FIG. 2B is a schematic diagram of a portion of GPU 250 shown in FIG. 2A configured to perform a texture filtering operation, according to one embodiment of the present invention. To illustrate, suppose the texture filtering operation is to bilinearly interpolate four texel colors, $C_0$, $C_1$, $C_2$, and $C_3$, with user-specified filter weights, $w_0'$, $w_1'$, $w_2'$, and $w_3'$, for a pixel at texture coordinate $p_x$ shown in FIG. 2C to generate a final color value, Cx'. As pixel shader engine 254 executes executable shader program 262, such execution causes pixel shader engine 254 to issue a single shader program instruction, herein referred to as the TEXW instruction, to texture unit 256. According to one embodiment of the present invention, the semantics of this instruction include an output argument and multiple input arguments, such as: TEXW $C_x'$, $p_x$, $w_i'$, texture[n]. Here, texture[n] corresponds to a particular texture map stored in texture buffer 266, such as texture map 280. With $p_x$, $w_i'$, and texture[n] as inputs, texture unit 256 sends a read request to texture buffer 266 to fetch the texel colors, $C_i$, and use the fetched texture colors and the corresponding user-specified filter weights, $w_i'$, to derive the final texture value $C_x'$. Texture unit 256 then returns this the final color value to pixel shader engine 254. It is worth noting that although the discussions above mainly focus one texture attribute, color, it should be apparent to a person with ordinary skill in the art to recognize that other texture characteristics, such as lighting and transparency values, are also within the scope of the claimed invention.

Figure 2D:
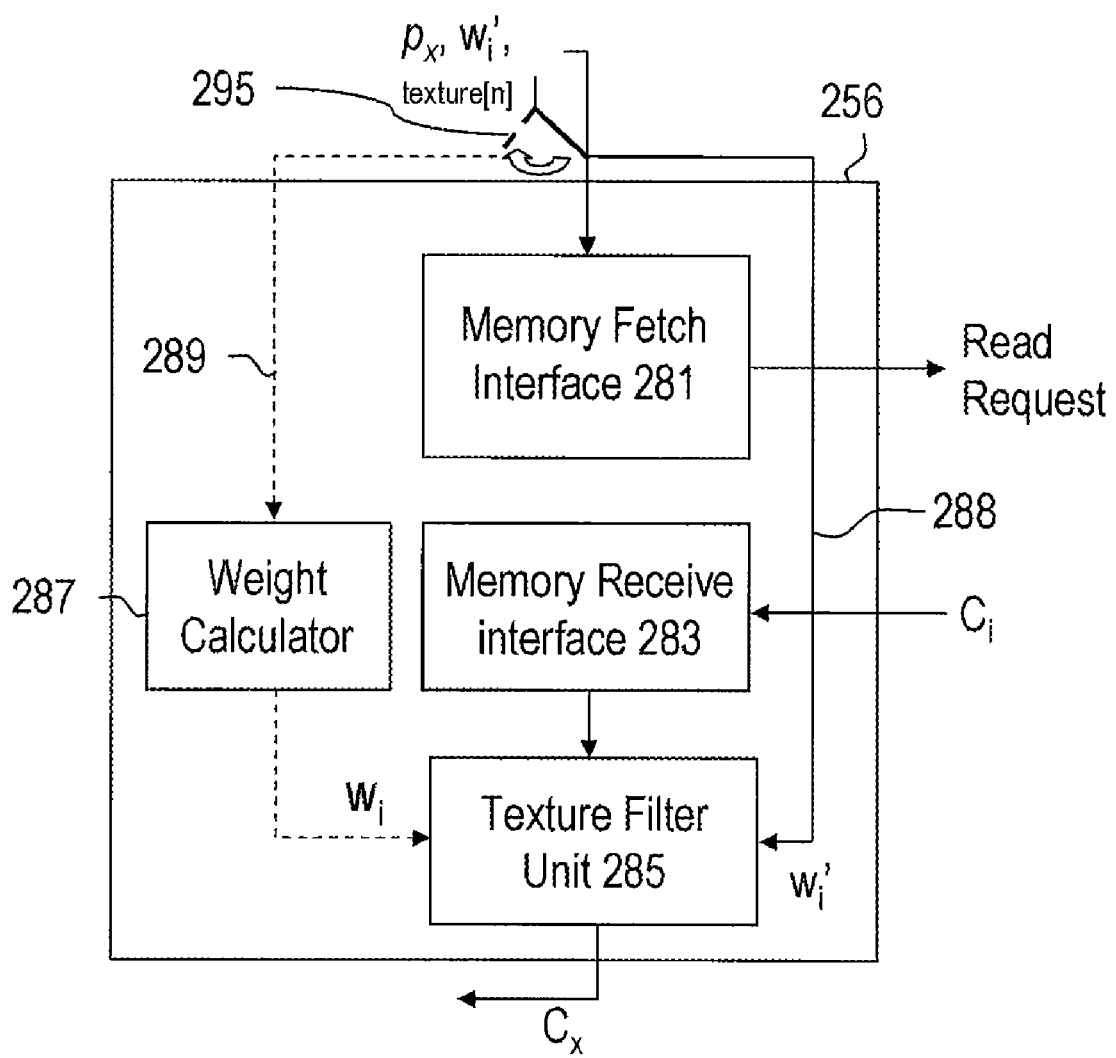
FIG. 2D is a block diagram detailing the structure of a texture unit designed to perform a texture mapping operation using programmable filter weights, according to one embodiment of the present invention.

FIG. 2D is a block diagram detailing the structure of texture unit 256 designed to perform a texture mapping operation using programmable filter weights, according to one embodiment of the present invention. Texture unit 256 includes a memory fetch interface 281, a memory receive interface 283, a weight calculator 287, and a texture filter unit 285. Continuing with the example of FIG. 2C, memory fetch interface 281 uses the texture coordinates $R_1$ and texture[n] inputs to issue requests for the texel colors, $C_0$, $C_1$, $C_2$, and $C_3$ from texture map 280. After memory receive interface 283 receives these requested texel colors, denoted as $C_i$, from texture buffer 266, memory receive interface 283 directs the received $C_i$ to texture filter unit 285. Texture filter unit 285 then uses the texel colors, $C_i$, and the user-specified filter weights, $w_0'$, $w_1'$, $w_2'$, and $w_3'$, received via path 288 to generate the final color value $C_x'$.

In addition to supporting a shader program instruction like TEXW, one embodiment of texture unit 256 also supports conventional shader program instructions, for example, the shader program instruction TEX. To enable this backward compatibility feature, texture unit 256 is shown in FIG. 2D with a programmable switch 295. If the incoming texture instruction is a conventional TEX instruction without user filter weights, programmable switch 295 is configured to switch to path 289, shown in a dotted line in FIG. 2D. Weight calculator 287 receives input arguments $p_x$ and determines the filter weights based on a set of fixed formulae. For a bilinear interpolation operation, these fixed formulae include equations for deriving the distances between the location of $p_x$ on the input texture[n] and the location of each of its surrounding texel grids. The derived distances correspond to the filter weights. Then weigh calculator 287 provides the calculated filter weights, denoted as $w_i$, to texture filter unit 285. If, on the other hand, the incoming instruction provides texture unit 256 with user-specified filter weights, then programmable switch 295 is configured to switch to path 288. Alternatively, another embodiment of texture unit 256 may support two separate inputs, each connecting to either path 288 or path 289 to support one of the two filter modes described above.

Figure 3:
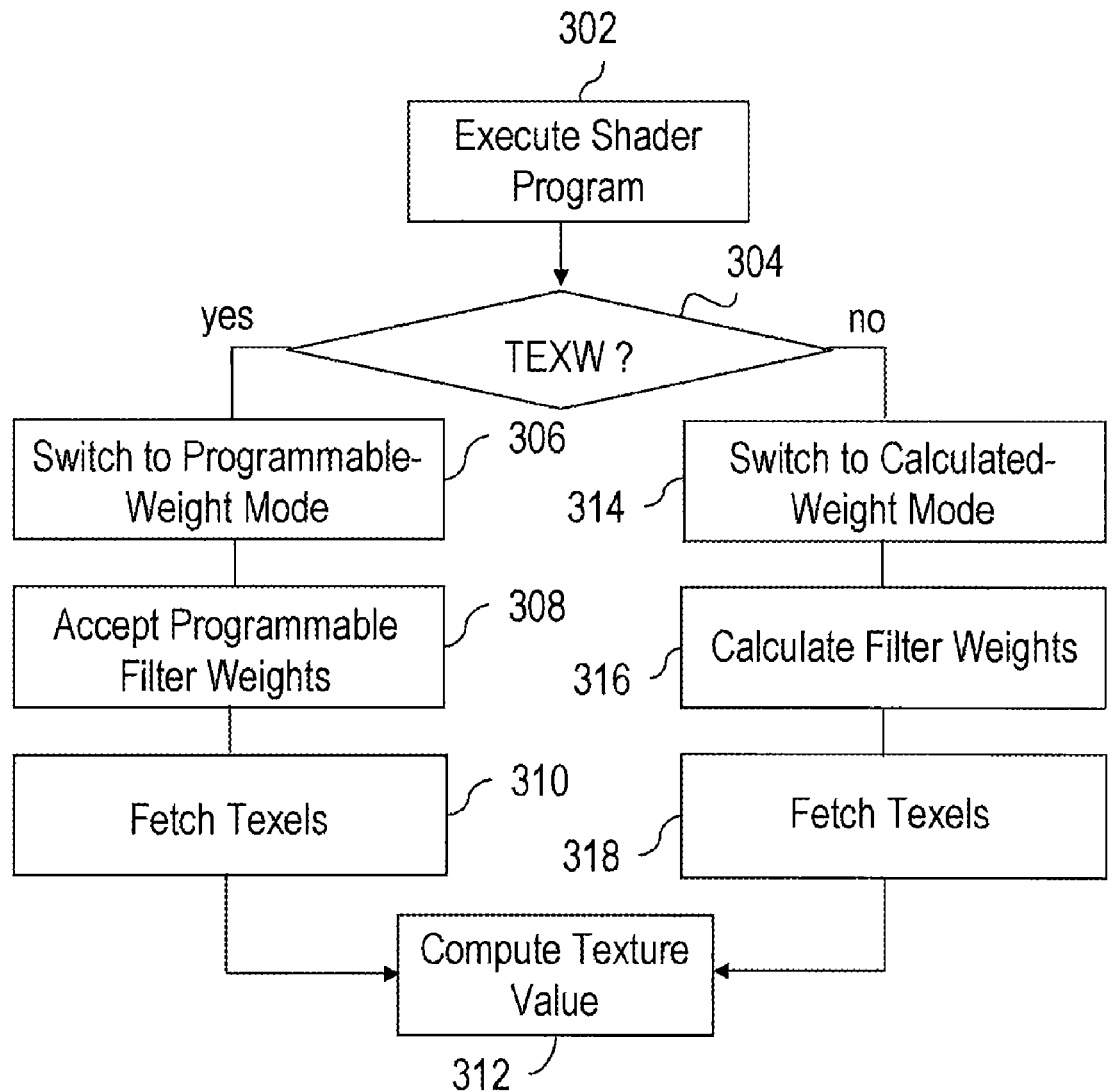
FIG. 3 is a flowchart of method steps for configuring a texture unit to perform texture mapping operations with programmable filter weights, according to one embodiment of the present invention.

FIG. 3 is a flowchart of method steps for configuring texture unit 256 to perform texture mapping operations with programmable filter weights, according to one embodiment of the present invention. In conjunction with pixel shader engine 254 shown in FIG. 2A and texture unit 256 shown in FIG. 2D, in step 302, pixel shader engine 254 executes executable shader program 262. Executable shader program 262 may invoke texture mapping instructions for texture unit 256. In step 304, pixel shader engine 254 determines whether an invoked instruction for texture unit 256 is the TEXW instruction. Suppose the invoked instruction is the conventional TEX instruction. Pixel shader engine 254 would then cause the operation mode of texture unit 256 to be set to the calculated-weight mode in step 314. In one implementation, this involves configuring programmable switch 295 to switch to path 289. Once texture unit 256 is in this calculated-weight mode, weight calculator 287 in texture unit 256 calculates the filter weights based on some fixed formulae and the input arguments specified in the TEX instruction in step 316. After the relevant texel attributes are fetched from the texture map specified in the TEX instruction in step 318, texture filter unit 285 of texture unit 254 applies the calculated filter weights in computing a texture value in step 312.

However, if executable shader program 262 invokes the TEXW instruction, then pixel shader engine 254 causes the operation mode of texture unit 256 to be set to a programmable-weight mode in step 306. In one implementation, this involves configuring programmable switch 295 to switch to path 288. Once texture unit 256 is in this programmable-weight mode, texture unit 256 accepts the filter weights specified in the TEXW instruction in step 308. After the relevant texel attributes are fetched from the texture map specified in the TEXW instruction in step 310, texture filter unit 285 of texture unit 254 applies the user-specified filter weights in computing a texture value in step 312.

In one implementation, the TEXW instruction or any other instruction offering the similar functionality as TEXW detailed above may be a part of API 216 shown in FIG. 2A, so that it can be invoked by any application program developed using API 216, regardless of the hardware platform such application program executes on. Also, the TEXW instruction in conjunction with texture unit 256 shown in FIG. 2D enable a developer to design intelligent filtering methods, such as Pradeep Sen's proposed approach, requiring far less clock cycles to execute than the conventional approaches, some of which are discussed in the Background section. Lastly, although bilinear interpolation has been used throughout the disclosure to illustrate one or more aspects of the present invention, it should be apparent to a person skilled in the art to recognize that the TEXW instruction can also be implemented in texturing hardware using trilinear interpolation, which involves blending or averaging bilinear interpolations performed on mipmaps with different levels of details. In essence, texture filter unit 285 and weight calculator 287 can be of any type of filtering schemes based on weight sums, and there can be arbitrarily many user-specified interpolation weights $w_i$.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A texture unit configured to perform a texture filtering operation, the texture unit comprising:
    a switch;
    a memory receive interface coupled to a texture filter unit; and
    a weight calculator, also coupled to the texture filter unit, wherein:
        the switch switches from a first data path for the texture filter unit to receive one or more calculated filter weights to a second data path for the texture filter unit to receive one or more programmable filter weights based on a filter mode indicated by a shader program instruction received by the texture unit,
        the texture filter unit extracts a first programmable filter weight from the shader program instruction, wherein the first programmable filter weight corresponds to a first texel associated with a screen pixel mapped to a texture map,
        the memory receive interface fetches the first texel from the texture map, and
        the texture filter unit computes a first texture value for the screen pixel by applying the first programmable filter weight to the first texel.

2. The texture unit of claim 1, wherein the texture filter unit computes the first texture value by performing bilinear or trilinear interpolation.

3. The texture unit of claim 2, wherein the filter mode indicates that the first texture value should be computed using the one or more programmable filter weights.

4. The texture unit of claim 3, wherein the texture filter unit receives texture coordinates of the first texel, the first programmable filter weight, and an identifier of the texture map specified in a single shader program instruction.

5. The texture unit of claim 3, wherein the texture filter unit receives texture coordinates of the first texel, the first programmable filter weight, and an identifier of the texture map prior to computing the first texture value.

6. The texture unit of claim 1, if the texture filter unit receives a first calculated filter weight corresponding to a second texel over the first data path, then the texture filter unit computes a second texture value for a second screen pixel by applying the first calculated filter weight to the second texel.

7. The texture unit of claim 6, wherein a second filter mode of a second shader program instruction indicates that the second texture value should be computed using the one or more calculated filter weights.

8. The texture unit of claim 7, wherein the weight calculator generates the first calculated filter weight.

9. A computing device configured to perform a texture filtering operation, the computing device comprising:
    a processing unit that includes a texture unit; and
    a local memory coupled to the processing unit containing a texture map, wherein the texture unit is configured to:
        receive a shader program instruction relating to a filter mode;
        switch from a first data path for receiving one or more calculated filter weights to a second data path for receiving one or more programmable filter weights based on the filter mode,
        extract a first programmable filter weight from the shader program instruction, wherein the first programmable filter weight corresponds to a first texel associated with a screen pixel mapped to a texture map,
        fetch the first texel from the texture map, and
        compute a first texture value for the screen pixel by applying the first programmable filter weight to the first texel.

10. The computing device of claim 9, wherein the texture unit computes the first texture value by performing bilinear or trilinear interpolation.

11. The computing device of claim 10, wherein the filter mode indicates that the first texture value should be computed using the one or more programmable filter weights.

12. The computing device of claim 11, wherein the texture unit receives texture coordinates of the first texel, the first programmable filter weight, and an identifier of the texture map specified in a single shader program instruction.

13. The computing device of claim 11, wherein the texture unit receives texture coordinates of the first texel, the first programmable filter weight, and an identifier of the texture map prior to computing the first texture value.

14. The computing device of claim 9, if the texture unit generates a first calculated filter weight corresponding to a second texel over the first data path, then the texture filter unit computes a second texture value for a second screen pixel by applying the first calculated filter weight to the second texel.

15. The computing device of claim 14, wherein the texture unit generates the first calculated filter weight, if a second shader program instruction relating to a second filter mode indicates that the second texture value should be computed using the one or more calculated filter weights.

* * * * *